(12) United States Patent
Serboncini et al.

(10) Patent No.: US 9,344,509 B1
(45) Date of Patent: May 17, 2016

(54) IDENTIFYING CANDIDATE SUBSCRIBERS FOR A CHANNEL

(71) Applicant: GOOGLE INC., Mountain View, CA (US)

(72) Inventors: Fernando Altomare Serboncini, Zurich (CH); Dimitre Trendafilov, Wollerau (CH)

(73) Assignee: GOOGLE INC., Mountain View, CA (US)

( * ) Notice: Subject to any disclaimer, the term of this patent is extended or adjusted under 35 U.S.C. 154(b) by 230 days.

(21) Appl. No.: 13/839,244

(22) Filed: Mar. 15, 2013

(51) Int. Cl.
  *G06F 15/173* (2006.01)
  *H04L 29/08* (2006.01)
(52) U.S. Cl.
  CPC ................................... *H04L 67/22* (2013.01)
(58) Field of Classification Search
  CPC ...................................................... H04L 67/22
  USPC .......................................................... 709/224
  See application file for complete search history.

(56) References Cited

U.S. PATENT DOCUMENTS

2012/0185892 A1\* 7/2012 Camplejohn et al. ........... 725/27
2014/0040170 A1\* 2/2014 Zheng et al. .................... 706/12

\* cited by examiner

*Primary Examiner* — Ruolei Zong
*Assistant Examiner* — Andrew Woo
(74) *Attorney, Agent, or Firm* — Lowenstein Sandler LLP (57) ABSTRACT

A server computer system identifies activity data for an entity. The activity data for the entity relates to one or more online media items. The server computer system compares the activity data to subscriber data for a channel. The subscriber data includes sets of features for subscribers of the channel. The server computer system determines that the entity is a candidate subscriber for the channel when the activity data corresponds to at least one of the plurality of sets of features.

17 Claims, 6 Drawing Sheets

IDENTIFYING CANDIDATE SUBSCRIBERS FOR A CHANNEL

TECHNICAL FIELD

The present disclosure relates to channels and, more particularly, to a technique of identifying candidate subscribers for a channel.

BACKGROUND

There can be various types of media, such as offline media and online media. One example of online media is media that is available using the Internet and/or an application (e.g., mobile application). Examples of online media can include digital video, digital movies, digital photos, digital music, website content, social media updates, etc. Content providers (e.g., content hosting websites, mobile applications) can allow entities to upload, view, and share online media items, such as audio clips, movie clips, TV clips, and music videos, as well as amateur content such as video blogging, short original videos, pictures, photos, etc. An entity can be a user, a group of users, a business organization such as a corporation, an educational institution such as a college and university, etc.

The content providers can use one or more channels to present data. A channel can be data content available from a common source or data content having a common subject or theme. For example, a channel can be a collection of videos viewable on a website or using a mobile application. For example, Car-Company-A may have a channel that is accessed by entities through the Internet and/or mobile applications. The channel for Car-Company-A may include multiple videos, such as a video of an Electric-Vehicle that is manufactured by Car-Company-A, a video of a sports utility vehicle that is manufactured by Car-Company-A, etc. Entities can view an online media item from the channel by selecting the online media item from the channel user interface (e.g., channel webpage, channel mobile application graphical user interface). Entities may subscribe to one or more channels to be able to view online media items from the entity's channel subscriptions.

Channel owners (e.g., Car-Company-A) may wish to increase the number of subscribers to their respective channels. Some channel owners may advertise their channel content to entities in an effort to attract new entities to their respective channels. Traditional solutions allow advertisers (e.g., channel owners) to advertise their channel content to various entities based on general topics. For example, conventional solutions may allow channel owners to advertise to entities that show an interest in cars. Traditional solutions, however, typically do not allow advertisers to advertise based on specific channel content.

SUMMARY

The following presents a simplified summary of various aspects of this disclosure in order to provide a basic understanding of such aspects. This summary is not an extensive overview of all contemplated aspects, and is intended to neither identify key or critical elements nor delineate the scope of such aspects. Its purpose is to present some concepts of this disclosure in a simplified form as a prelude to the more detailed description that is presented later.

A method and system to identify candidate subscribers for a channel is described. The method includes identifying activity data for an entity. The activity data relates to one or more online media items. The method further includes comparing the activity data to subscriber data for a channel. The subscriber data includes sets of features for subscribers of the channel. The method further includes determining that the entity is a candidate subscriber for the channel when the activity data corresponds to at least one set of features.

An apparatus to identify candidate subscribers for a channel is also described. The apparatus includes means for identifying activity data for an entity. The activity data relates to one or more online media items. The apparatus further includes means for comparing the activity data to subscriber data for a channel. The subscriber data includes sets of features for subscribers of the channel. The apparatus further includes means for determining that the entity is a candidate subscriber for the channel when the activity data corresponds to at least one set of features. The activity data can include at least one of data relating to one or more searches for one or more online media items or consumption of one or more online media items. The set of features include at least one of an identifier of an online media item, an event type, a set of keywords for a search, a set of search results, consumption time, or a geographic identifier.

The apparatus further includes means for directing content to the candidate subscriber. The content is related to the channel. The apparatus further includes means for determining that the entity is a candidate subscriber for the channel, means for identifying a relationship between the channel and another channel, and means for determining that the entity is a candidate subscriber for the other channel based on the relationship between the channel and the other channel. The apparatus further includes means for extracting a set of features from the activity data for the entity, means for inputting the set of features from the activity data into a classifier model that corresponds to the channel, and means for identifying the at least one of the plurality of sets of features from the classifier model that corresponds to the set of features from the activity data for the entity. The classifier model includes sets of features for the subscribers of the channel. The apparatus further includes means for extracting the plurality of sets of features from activity data for the plurality of subscribers that subscribe to the channel and means for creating the classifier model using the plurality of sets of features for the subscribers. The sets of features for the subscribers relate to one or more online media items.

BRIEF DESCRIPTION OF THE DRAWINGS

The present disclosure will be understood more fully from the detailed description given below and from the accompanying drawings of various implementations of the disclosure.

DETAILED DESCRIPTION

A system and method for identifying candidate subscribers for a channel is described, according to various implementations. A channel can be data content available from a common source or data content having a common subject or theme. For example, a channel can be a collection of videos viewable on a website and/or using a mobile application. The channel content can be accessed by an entity. An entity can include, and is not limited to, a user, a group of users, a business organization such as a corporation, an educational institution such as a college and university, etc. An entity's identity may be treated so no personally identifiable information can be obtained. A channel can have an owner that uploads particular online media items (e.g., videos) for the channel. A channel owner can be an entity. For example, an entity "Car-Company-A" may have a channel with data content that is accessed through the Internet and/or mobile applications. The channel for Car-Company-A may include multiple videos, such as a video of an Electric-Vehicle that is manufactured by Car-Company-A, a video of a sports utility vehicle that is manufactured by Car-Company-A, a video of a convertible vehicle that is manufactured by Car-Company-A, etc.

Examples of an online media item can include, and are not limited to, digital video, digital movies, digital photos, digital music, website content, social media updates, electronic books (ebooks), electronic magazines, digital newspapers, digital audio books, electronic journals, web blogs, real simple syndication (RSS) feeds, electronic comic books, software applications, etc. An online media item can be a media item consumed via the Internet and/or via a mobile device application. For brevity and simplicity, an online video (also hereinafter referred to as a video) is used as an example of an online media item throughout this document.

Entities may subscribe to one or more channels to be able to view online media items (e.g., videos) from the entity's channel subscriptions For example, an entity may be an automotive organization, and the automotive organization may subscribe to the Car-Company-A channel. Implementations of the present disclosure can drive entity traffic to a channel user interface (e.g., channel webpage, channel mobile application graphical user interface (GUI)) based on one or more characteristics of the group of entities that are currently subscribing to the channel. Implementations can identify a segment of entities that are not currently subscribing to a channel as potential channel subscribers. Implementations can allow advertisers to serve advertisements to the group of entities that may be potential channel subscribers in an effort to drive entity traffic to the channel user interface. A potential channel subscriber is hereinafter referred to as a "candidate subscriber".

Figure 1:
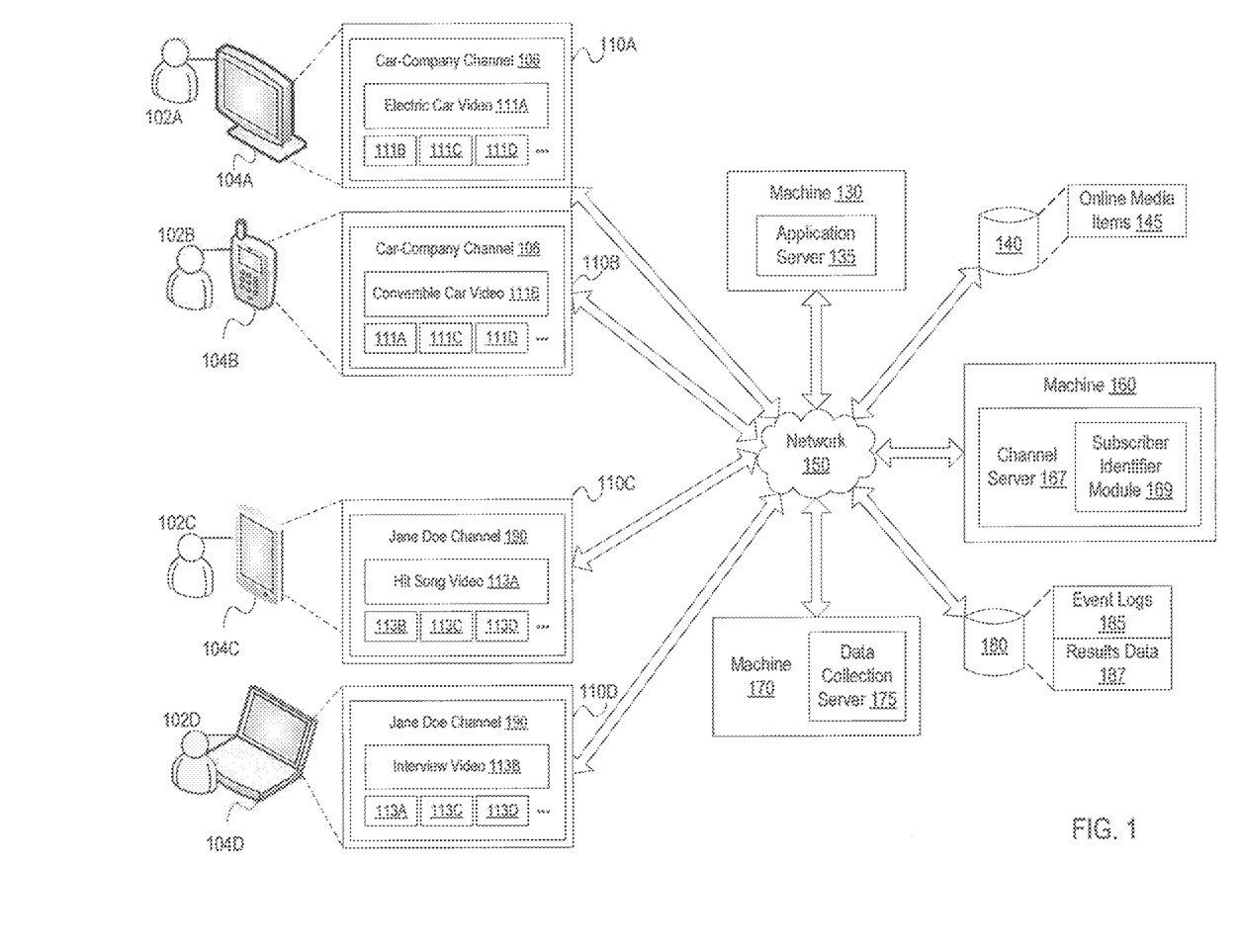
FIG. 1 illustrates example system architecture, in accordance with various implementations of the present disclosure.

FIG. 1 illustrates an example system architecture 100 in which examples of the present disclosure can be implemented. The system architecture 100 can include one or more client devices 104A-D, one or more machines 130,160,170 and one or more data stores 140,180 coupled to each other over a network 150. Network 150 may be a public network (e.g., the Internet), a private network (e.g., a local area network (LAN) or wide area network (WAN)), or a combination thereof.

One or more data stores 140 can store online media items 145. As used herein, "media," media item," "online media item," "digital media," and a "digital media item" can include an electronic file that can be executed or loaded using software, firmware or hardware configured to present the digital media item to an entity. Examples of online media items 145 can include, and are not limited to, digital video, digital movies, digital photos, digital music, website content, social media updates, electronic books (ebooks), electronic magazines, digital newspapers, digital audio books, electronic journals, web blogs, real simple syndication (RSS) feeds, electronic comic books, software applications, etc.

One or more machines 160 can host a channel server 167 to provide channels to present channel content (e.g., online media items) to Entities 102A-D via a channel user interface (e.g., channel webpage, channel mobile application GUI, channel). For example, Car-Company-A may have a channel 106 that is accessed by Entities 102A-B through the Internet and/or mobile applications. The channel 106 for Car-Company-A may include multiple videos, such as a video 111A of an electric vehicle that is manufactured by Car-Company-A, a video 111B of a sports utility vehicle that is manufactured by Car-Company-A, a video 111C of a convertible vehicle that is manufactured by Car-Company-A, a video 111D of a commercial for the electric vehicle, etc. In another example, musician Jane Doe may have a channel 190 that includes multiple videos, such as a music video 113A of Jane Doe's latest hit song, a video 113B of Jane Doe's performance at the "Music Awards", a video 113C of an interview of Jane Doe, a video 113D clip of a performance at Jane Doe's concert, etc. The data store 140 may store videos 111A-D for Car-Company Channel 106 and videos 113A-B for Jane Doe Channel 190.

Various entities 102A-D can use one or more client devices 104A-D to consume online media items 145 (e.g., videos 111A-D, videos 113A-D). The client devices 104A-D can run an operating system (OS) that manages hardware and software of the client devices 104A-D. An application 110A-D can run on the client devices 104A-D (e.g., on the OS of the client devices). An application 110A-D can be any type of application including, for example, a web application, a desktop application, a browser application, a mobile device application (e.g., smart phone application, media player application, tablet device application, etc.) etc. Examples of a mobile device can include, and are not limited to, phones, tablet computers, media players, personal digital assistants, etc.

The client devices 104A-D can consume online media items 145 (e.g., videos 111A-D, videos 113A-D) via the application 110A-D. For example, the application 110A-D can access the online media items 145 served by an application server 135 hosted by the machine 130. The machine 130 can host an application server 135 to provide web applications, mobile device applications, desktop applications, and data (e.g., online media items 145) for the applications 110A-D. For example, the videos 113A-D for the Jane Doe Channel 190 may be accessed via an application 110A-D and the application server 135 and/or the channel server 167. In one implementation, the application server 135 and channel server 167 reside in the same machine. In another implementation, the application server 135 and channel server 167 reside in separate machines.

The client devices 104A-D can be portable computing devices, such as, cellular telephones, personal digital assistants (PDAs), portable media players, netbooks, laptop computers, electronic book readers, tablet computers, and the like. The client devices 104A-D can also be other types of computing devices such as desktop computers, set-top boxes, gaming consoles, televisions, etc. that may not traditionally be considered to be portable.

One or more machines 170 can include a data collection server 175 to collect data of events occurring relating to client devices 104A-D. In one example, an event may be an application 110A-D (e.g., web browser, mobile application) performing a search for an online media item 145. For example, an application 110A-D can receive entity input of a set of keywords and can perform a search for one or more online media items based on the set of keywords. In another example, an event may be a client device 104A-D consuming an online media item 145 (e.g., videos 111A-D, videos 113A-D).

The data collection server 175 can collect event data (e.g., search data, consumption data) and can create and store event logs 185 in one or more data stores 180. The event logs 185 can include for each event, for example, and not limited to, an identifier of the online media item, the type of event (e.g., search event, consumption event), the set of keywords for a search event, the set of results for a search event, a channel identifier associated with the event, consumption time, an indicator of whether an advertisement was skipped in relation to the event, a geographic identifier associated with the client device consuming an online media item, a language associated with the online media item, a number of online media items consumed in a session, etc.

In the instance where the entity (e.g., Entity 102A-D) consents to the use of such data in the event logs 185, a subscriber identifier module 169 in a channel server 167 hosted by a machine 160 can use the data to identify characteristics of one or more groups of entities that subscribe to a channel. The subscriber identifier module 169 can use the characteristics to identify entities with similar characteristics, and do not currently subscribe to the channel, as candidate subscribers for the channel. The candidate subscribers for one or more channels can be stored as results data 187 in the data store 180. Certain data in the event logs 185 may be treated in one or more ways before it is stored or used, so that personally identifiable information is removed. Implementations can treat an identity of an entity (e.g., User 102A-D) so that no personally identifiable information can be determined for the entity. Implementations can generalize the geographic location of an entity (e.g., Entity 102A-D) and/or client device (e.g., client device 104A-D) where location information is obtained (such as to a city, ZIP code, or state level), so that a particular location of an entity and/or client device cannot be determined.

The results data 180 can include the entities that are candidate subscribers for one or more channels (e.g., Car-Company Channel 106, Jane Doe Channel 190). The results data 180 can be used to drive entity traffic to the corresponding channel user interface (e.g., channel webpage, channel mobile application GUI, channel desktop application GUI). For example, the subscriber identifier module 169 can allow advertisers to serve advertisements to candidate subscribers for the channel as an attempt to drive entity traffic to the channel user interface. For example, the subscriber identifier module 169 can allow advertisers to serve advertisements for Car-Company Channel videos 111A-D to candidate subscribers for the Car-Company Channel 106 as an attempt to drive entity traffic to the Car-Company Channel 106 user interface.

The subscriber identifier module 169 can extract data items, which correspond to subscribers of channels, from the event logs 185, and can determine characteristics of the subscribers. The subscriber identifier module 169 can use the characteristics of the current subscribers of the channels to locate entities, which have similar characteristics and that do not subscribe to the one or more channels, and can identify those entities as candidate subscribers for the channels. For example, Entities 102A-B may subscribe to the Car-Company Channel 106. The subscriber identifier module 169 can use the data in the event logs 185 for the Entities 102A-B that subscribe to the Car-Company Channel 106 to create a classifier model for the Car-Company Channel 106. A classifier model is a function that uses input data and makes a classification based on the input data. For example, the subscriber identifier module 169 can use the classifier model for the Car-Company Channel 106 to evaluate entities that are not subscribers to the Car-Company Channel 106 to determine whether the entities have characteristics similar to the current subscribers and may be potential subscribers to the Car-Company Channel 106.

The subscriber identifier module 169 can create a classifier model for each channel. For example, the subscriber identifier module 169 can create a classifier model for the Car-Company Channel 106 and for the Jane Doe Channel 190. The subscriber identifier module 169 can evaluate entities that are not subscribers to the one or more channels and can determine whether they may be potential subscribers to the Car-Company Channel 106 and/or to the Jane Doe Channel 190.

The machines 130,160,170 can collect demographic information pertaining to groups of entities (e.g., age of user groups, geography (e.g., country, state, city) of entity groups) and/or client devices 104A-D, and store the entity information in one or more data stores 180. In situations in which the systems discussed here collect personal information about entities, or may make use of personal information, the entities may be provided with an opportunity to control whether programs or features collect entity information (e.g., information about a entity's social network, social actions or activities, profession, an entities' preferences, or an entity's current location), or to control whether and/or how to receive content from the content server that may be more relevant to the entity. In addition, certain data (e.g., event logs 185) may be treated in one or more ways before it is stored or used, so that personally identifiable information is removed. For example, an entity's identity may be treated so that no personally identifiable information can be determined for the entity, or an entity's geographic location may be generalized where location information is obtained (such as to a city, ZIP code, or state level), so that a particular location of an entity cannot be determined. Thus, the entity may have control over how information is collected about the entity and used by a server (e.g., data collection server 175, channel server 167, application server 135).

The machines 130,160,170 can be a rackmount server computer, a router computer, a personal computer, a portable digital assistant, a mobile phone, a laptop computer, a tablet computer, a camera, a video camera, a netbook, a desktop computer, a media center, or any combination of the above. A data store 140,180 can be a persistent storage that is capable of storing data. As will be appreciated by those skilled in the art, in some implementations data store 140,180 might be a network-attached file server, while in other implementations data store 140,180 might be some other type of persistent storage such as an object-oriented database, a relational database, and so forth.

Figure 2:
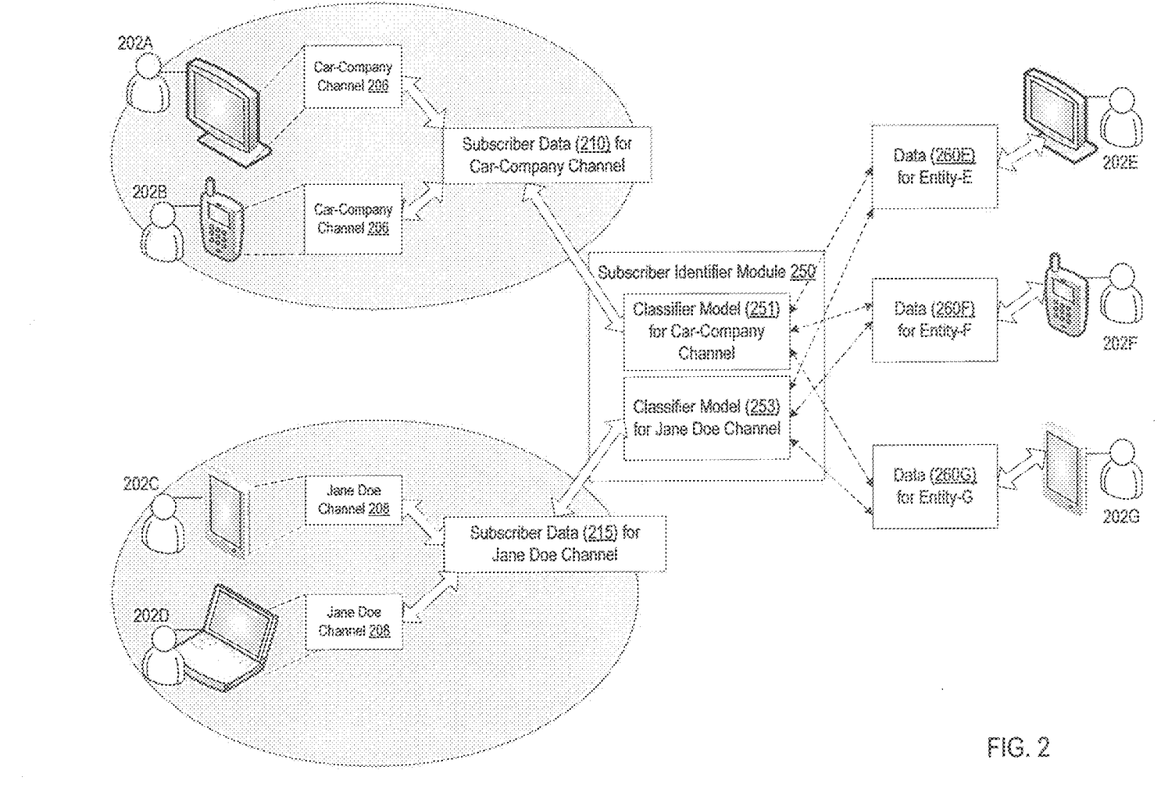
FIG. 2 is a block diagram of a subscriber identifier module using classifier models for online media channels to identify candidate subscribers for the online media channels, in accordance with various implementations.

FIG. 2 is a block diagram of a subscriber identifier module 250 using classifier models for channels to identify candidate subscribers for the channels. The subscriber identifier module 250 can correspond to the subscriber identifier module 169 hosted in a machine 160 in FIG. 1. Entities 202A-B may subscribe to the Car-Company Channel 206 and Entities 202C-D may subscribe to the Jane Doe Channel 208. The subscriber identifier module 250 can create a classifier model 251 for the Car-Company Channel 206 using subscriber data 210 and can create a classifier model 253 for the Jane Doe Channel 208 using subscriber data 215. The subscriber data 210,215 can be sets of data from event logs (e.g., event logs 185 in FIG. 1) that store activity data. For example, subscriber data 210 can be a set of activity data from the event logs that relates to the subscribers of the Car-Company Channel 206, such as Entities 202A-B.

The subscriber identifier module 250 can create the classifier model 251 for the Car-Company Channel 206 by extracting sets of features from the subscriber data 210 for the entities (e.g., Entities 202A-B) that subscribe to the Car-Company Channel 206. The features can include, for example, and are not limited to, an identifier of the online media item, the type of event (e.g., search event, consumption event), the set of keywords for a search event, the set of results for a search event, a channel identifier associated with the event, consumption time, an indicator of whether an advertisement was skipped in relation to the event, a geographic identifier associated with the client device consuming an online media item, a language associated with the online media item, a number of online media items consumed in a session, etc.

The subscriber data 210 can be used as a set of training data to create the classifier model 251 for the Car-Company Channel 206. A set of training data is a set of data that can be used to define classifications. An example of training data for creating and training a classifier model is described in greater detail below in conjunction with FIG. 3. For example, the subscriber data 210 may indicate that one or more subscribers (e.g., Entities 202A-B) have performed online media searches using the keywords "electric" and "vehicle". The subscriber identifier module 250 can use the features of the search keywords "electric" and "vehicle" to train the classifier model 251 for the Car-Company Channel 206. For example, the subscriber identifier module 250 may determine that a search using "electric" and "vehicle" is not enough to classify other entities that also perform searches using "electric" and "vehicle" as candidate subscribers for the Car-Company Channel 206. In another example, the subscriber data 210 that is used as training data may indicate that many subscribers to the Car-Company Channel 206 have watched "electric-car-video-56002811" for at least forty seconds. The classifier model 251 for the Car-Company Channel 206 may be trained, such that, when the classifier model 251 receives input data that includes consuming video "electric-car-video-56002811" for at least forty seconds, the classifier model 251 can classify the entity that is associated with the input data as a candidate subscriber for the Car-Company Channel 206.

The subscriber identifier module 250 can validate the classifier model 251 by executing the classifier model 251 using subscriber data that was not used for training input for the classifier model 251. For example, subscriber data 215 for Entities 202C-B may not have been used to train the classifier model 251, and the subscriber identifier module 250 can execute the classifier model 251 using data for Entities 202C-D as validation data. The classifier model 251 may identify that the Entities 202C-D are candidate subscribers for the Car-Company Channel 206. Entities 202C-D may be presented with advertisements for the Car-Company Channel 206, and the subscriber identifier module 250 can determine, for example, from event logs how many, if any, of the Entities 202C-D watched a video from the Car-Company Channel 206 and how many did not to validate the classifier model 251.

The classifier model 251 for the Car-Company Channel 206 can include multiple feature vectors. The feature vectors can include one or more features. The feature vectors can be "examples" of characteristics that can be used to classify input data. The input data can be data for entities that may not be subscribers to the one or more channels. For example, Entities 202E-G may not subscribe to the Car-Company Channel 206 and/or the Jane Doe Channel 208. The subscriber identifier module 250 can receive data 260E for Entity-E 202E. The data 260E can be data from event logs (e.g., event logs 185 in FIG. 1). The subscriber identifier module 250 can create a feature vector for the Entity-E 202E using the data 260E. The subscriber identifier module 250 can identify a feature vector in the classifier model 251 for the Car-Company Channel 206 and/or a feature vector in the classifier model 253 for the Jane Doe Channel 208 that is the closest match to the feature vector for the Entity-E 202E. In one implementation, there may not be any feature vectors in a classifier model that is the closest match to the input feature vector.

The closest matching feature vector in the classifier model can include a label indicating whether or not the entity (e.g., Entity 202E) that is associated with the input feature vector should be classified as a candidate subscriber for the channel or not. For example, the feature vector for Entity-E 202E may include features indicating that the video "electric-car-video-56002811" was consumed for at least forty seconds by Entity-E 202E, and the closest matching feature vector in the classifier model 251 for the Car-Company Channel 206 may have a label "1" indicating that the entity (e.g., Entity-E 202E) that corresponds to the input feature vector should be classified as a candidate subscriber for the Car-Company Channel. The subscriber identifier module 250 can create data that indicates that the Entity-E 202E is a candidate subscriber for the Car-Company Channel 206.

There may not be any feature vectors in the classifier model 253 for the Jane Doe Channel 208 that is a closest match to the feature vector for Entity-E 202E. The subscriber identifier module 250 may not add the Entity-E 202E to the candidate subscriber data for the Jane Doe Channel 208.

The subscriber identifier module 250 can create feature vectors for entities (e.g., entities 202E-G) using data (e.g., data 260E-G) for the entities and can compare the feature vectors for the entities to the "examples" in the classifier models (e.g., models 251,253) of channels which the entities are not currently subscribing to. If there is a closest matching feature vector in any of the classifier models, and if the label for the closest matching feature vector indicates that the input feature vector should be candidate subscriber for the corresponding channel, the subscriber identifier module 250 can add the entity to a list of candidate subscribers for the channel.

In one implementation, the subscriber identifier module 250 identifies multiple channels that have a co-visitation relationship and determines that when the entity is a candidate subscriber for one of the channels, then the entity is also a candidate subscriber for the other channels in the co-visitation relationship. A co-visitation relationship between channels is a relationship that is based on a similar amount of channel activity from entities between the channels within the same session. For example, during a particular week, a musician Jane Doe may have performed at the Music Awards and may have won the Music Album of the Year Award. The Music Awards may have been hosted by a comedian Funny Joe. During that week, a large number of entities may have watched videos from the Jane Doe Channel. During the same week, a large number of entities may have watched videos from the Funny Joe Channel. The subscriber identifier module 250 can determine that the Jane Doe Channel and the Funny Joe Channel have a co-visitation relationship based on the large number of entities watching content from the channels during the same week. If the subscriber identifier module 250 determines that an entity is a candidate subscriber for the Jane Doe Channel, the subscriber identifier module 250 may determine that the entity is also a candidate subscriber for the Funny Joe Channel based on its co-visitation relationship with the Jane Doe Channel.

Figure 3:
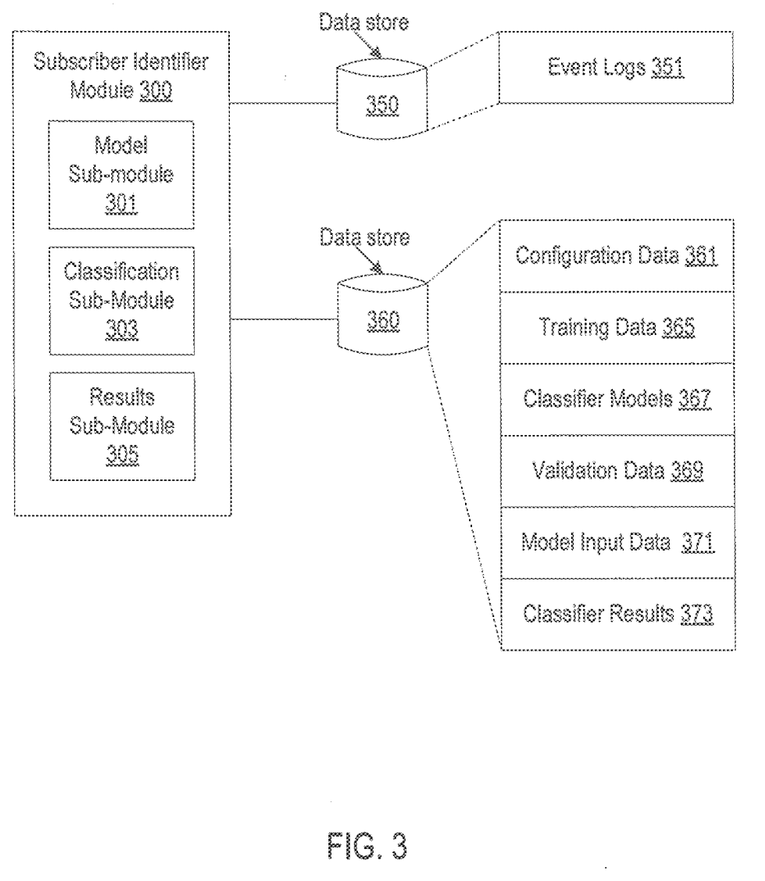
FIG. 3 is a block diagram of a subscriber identifier module, in accordance with various implementations.

FIG. 3 is a block diagram of a subscriber identifier module 300, in accordance with one implementation of the present disclosure. The subscriber identifier module 300 can include a model sub-module 301, a classification sub-module 303, and a results sub-module 305. Note that in alternative implementations, the functionality of one or more of the model sub-module 301, the classification sub-module 303, and the results sub-module 305 are combined or divided.

The subscriber identifier module 300 can be coupled to one or more data stores 350 that store event logs 351. The event logs 351 can describe entity activity in relation to online media items. The event logs 351 can include activity data for one or more entities. The event logs 351 can include data that represents activity for a "session" for the one or more entities. A session can be a period of time as specified in configuration data 361 that is stored in a data store 360 that is coupled to the subscriber identifier module 300. The session period can be pre-defined and/or user (e.g., system administrator) defined. For example, a session can be the last seven days.

The event logs 351 can include, for each event (e.g., search, consumption of online media item) in the session, for example, and not limited to, an identifier of the online media item, the type of event (e.g., search event, consumption event), the set of keywords for a search event, the set of results for a search event, a channel identifier associated with the event, consumption time, an indicator of whether an advertisement was skipped in relation to the event, a geographic identifier associated with the client device consuming an online media item, a language associated with the online media item, a number of online media items consumed in a session, etc.

The model sub-module 301 can process the events logs 351 to extract sets of features from the event logs 351 and format the extracted data for use as training data 365 to create, train, and tune a channel classifier model for one or more channels. The data store 360 can store training data 365 for one or more channels. The model sub-module 301 can store the channel classifier models 367 in the data store 360. The sets of features can be extracted for a particular channel. For example, the model sub-module 301 can extract sets of features for the Car-Company Channel from the event logs 351 using the channel identifier for the Car-Company Channel. Examples of the features, can include, and are not limited to, an identifier of the online media item, the type of event (e.g., search event, consumption event), the set of keywords for a search event, the set of results for a search event, a channel identifier associated with the event, consumption time, an indicator of whether an advertisement was skipped in relation to the event, a geographic identifier associated with the client device consuming an online media item, a language associated with the online media item, a number of online media items consumed in a session, etc. The model sub-module 301 can format the extracted data as training data 365, for example, as a comma-separate value (CSV) file, where each is row is an "example" consisting of a set of features and a "label" in a feature vector.

Figure 4:
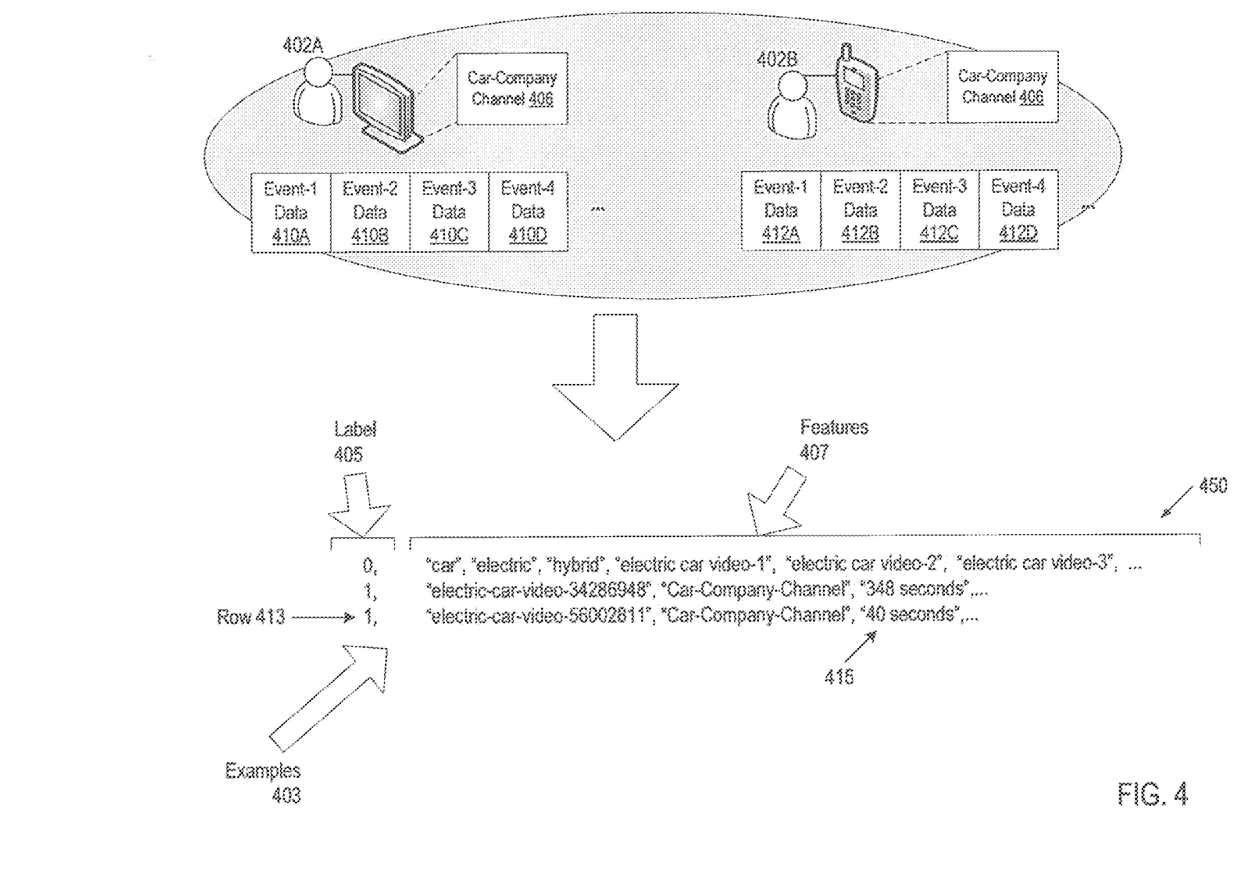
FIG. 4 illustrates an example of training data for a classifier model for a channel, in accordance with various implementations.

FIG. 4 illustrates an example of a training data 450 for a channel (e.g., Car-Company Channel 406), according to various implementations. The training data 450 can represent the activity data of multiple entities (e.g., Users 402A-B) that subscribe to the Car-Company Channel 406 for one or more sessions (e.g., last seven days). The training data 450 may be formatted as a comma-separate value (CSV) file. The training data 450 can be a table, where each row is an "example" 403. In one implementation, the event data (e.g., data 410A-D, 412A-D) for the multiple events for multiple users (e.g., Users 402A-B) during one or more sessions (e.g., last seven days) is aggregated into one or more histograms to group together data that is of a similar type. Similar data from the multiple Users 402A-B can be used to create an "example" 403 in the table. One or more algorithms can be used to group similar data for creating an example 403 in the training data 450. For example, Event-2 Data 410B for User 402A and Event-4 Data 412D for User 402B may include consumption time of the video "electric-car-video-56002811". Event-2 Data 410B may indicate that User 402A watched the video for thirty-eight seconds. Event-4 Data 412D may indicate that User 402B watched the video for forty-two seconds. The average consumption time can be used as a feature in the feature vector for the example, as illustrated, in the example in row 413 that includes the consumption time 415 of forty seconds.

The event data 410A-D, 412A-D can include data for events that form a temporal sequence of a variable set of parameters. Data for the event can be mapped to a fixed size feature vector to form an example 403 in the training data 450. In one implementation, histograms are used to collect data from the event data 410A-D, 412A-D of the same type. For example, the subscriber identifier module can create a histogram to represent the count of videos that have been consumed for every channel. To take into account the temporal structure of the sequence of events, the subscriber identifier module can use multiple histograms to collect event parameters within different temporal windows (e.g. recent events and older events) or use separate temporal histogram, for example, to collect the number of consumptions at different hours of the day or days of the week, etc. In addition to the event parameters, the subscriber identifier module can add additional feature values associated to a whole session, such as, as not limited to, geography, language, etc.

The examples 403 have a collection of numeric or text features 407 (columns) that describe the corresponding example. The examples 403 also have a single label 405 that is assigned to the corresponding example. In one implementation, the label 405 is a binary value to represent a classification. For example, a label of "1" can indicate that an entity spent over five minutes on the channel and a label of "0" can indicate that a user spent five minutes or less on the channel. In one implementation, a label of "1" indicates that an entity is a candidate subscriber for a channel. The training table can have one label 405 column (e.g., the first column), and one or more feature 407 columns. The training table 450 can have multiple columns. The training table 450 can have multiple examples 403 (rows).

Returning to FIG. 3, the model sub-module 301 can use the feature vectors and labels in the examples to train a classifier model for the channel. The model sub-module 301 can train the classifier model using, for example, and not limited to, a logistic regression, SVM (support vector machine), neural networks, etc. The model sub-module 301 can format the data extracted from the event logs 351 for use as training data 365. For example, the model sub-module 301 may format the extracted data into a comma-separate value (CSV) file, where each is row is an "example" consisting of a set of features and a "label." The label can be assigned a value (e.g., "1" or "0") based on one or more criteria in the configuration data 361 or based on user (e.g., system administrator) input. The criteria can be pre-defined and/or user (e.g., system administrator) defined. For example, a criterion may be that if the entity watches more than five minutes of one or more videos from the channel, then the label should be "1". For example, an example feature vector (e.g., example in row 413 in FIG. 4) may include forty seconds for watching video "electric-car-video-56002811" from the Car-Company Channel, one hundred eighty-five seconds for watching video "electric-car-video-28195830" from the Car-Company Channel, one hundred thirty-four seconds for watching video "electric-car-video-48140122" from the Car-Company Channel, and a label of "1" to indicate that the entity spent more than five minutes on the Car-Company Channel.

The model sub-module 301 can validate the classifier models 367 by executing the classifier models 367 using validation data 369 that is stored in the data store 360. The validation data 369 can be data from the event logs 351 that is not used for training. The validation data 369 can be formatted as a comma-separate value (CSV) file that includes feature vectors that include sets of features. The model sub-module 301 can execute the classifier model 367 using the validation data 369 as input. One or more classifier models 367 may identify one or more entities are candidate subscribers for one or more corresponding channels. The candidate subscribers may be presented with advertisements for the corresponding channels and the model sub-module 301 can determine, for example, from event logs 351 how many, if any, of the candidate subscribers watched a video from the user interfaces of the channels and how many did not to validate the classifier models 367.

The model sub-module 401 can process the event logs 351 periodically and can add recently processed data from the event logs 351 to the training data 365 to tune the classifier model 367 for a channel. The process period can be a configurable time defined by configuration data 361. Examples of the process period can include, and are not limited to once a day, once every number of hours, at a specified time, etc. For example, the classifier model for Car-Company Channel may initially classify an entity that conducts a search using the keywords "electric", "car", and "hybrid" as not a candidate subscriber for the Car-Company Channel. As new training data is used to train the classifier model 367, the classifier model 367 may be adjusted by having more examples and may classify an entity that conducts a search using the keywords "electric", "car", and "hybrid" as a candidate subscriber for the Car-Company Channel.

The classification sub-module 303 can create model input data 371 for entities and can input the model input data 371 into the classifier models 367 to determine whether any of the entities are candidate subscribers for one or more the channels that corresponds to the classifier models 367. The classification sub-model 303 can extract data items that relate to an entity from event logs 351 and create a feature vector as model input data 371 for the entity using the extracted data items. The feature vector can include, for example, and not limited to an identifier of the online media item, the type of event (e.g., search event, consumption event), the set of keywords for a search event, the set of results for a search event, consumption time, an indicator of whether an advertisement was skipped in relation to the event, a geographic identifier associated with the client device consuming an online media item, etc.

The classification sub-model 303 can execute the classifier models 367 using the model input data 371 as input. The individual classifier models 367 can compare the features in the model input data 371 to the features and patterns in the examples in the training data in the classifier model to find the closest example that matches the model input data 371. In one implementation, there may not be any feature vectors in a classifier model that is the closest match to the features in the model input data 371 and the classifier model may return a null value. The classification sub-model 303 can use one or more criteria in the configuration data 361 for finding a closest matching feature vector. The configuration data 361 can be predefined and/or user (e.g., system administrator) defined.

The classification sub-model 303 can use the label that is assigned to the closest matching feature vector to determine whether the entity is a candidate subscriber or not. In one implementation, if the closest matching example has a label of "1", the entity is a candidate subscriber. In one implementation, the classification sub-model 303 identifies multiple channels that have a co-visitation relationship and determines that when the entity is a candidate subscriber for one of the channels, then the entity is also a candidate subscriber for the other channels in the co-visitation relationship. The classification sub-model 303 can use one or more criteria in the configuration data 361 for defining a co-visitation relationship between channels. The configuration data 361 can be predefined and/or user (e.g., system administrator) defined. For example, the configuration data 361 may specify that the number of entities engaging with a first channel should be within 5% of the of the number of entities engaging with a second channel in order for there to be a co-visitation relationship between the first channel and the second channel. The configuration data 361 may also specify that the entity activity for the first channel should occur during a same period (e.g., same week) as the entity activity for the second channel.

The results sub-module 305 can create classifier results 373 that include entities that are candidate subscribers to one or more channels. There may be classifier result data for each channel. The classifier results 373 can be stored in the data store 360. The results sub-module 305 can use the classifier results 373 to direct digital content to entities in the channel classifier results 373. The digital content (e.g., advertisements) can be related to one or more channels.

A data store 350,360 can be a persistent storage unit. A persistent storage unit can be a local storage unit or a remote storage unit. Persistent storage units can be a magnetic storage unit, optical storage unit, solid state storage unit, electronic storage units (main memory), or similar storage unit. Persistent storage units can be a monolithic device or a distributed set of devices. A 'set', as used herein, refers to any positive whole number of items.

Figure 5:
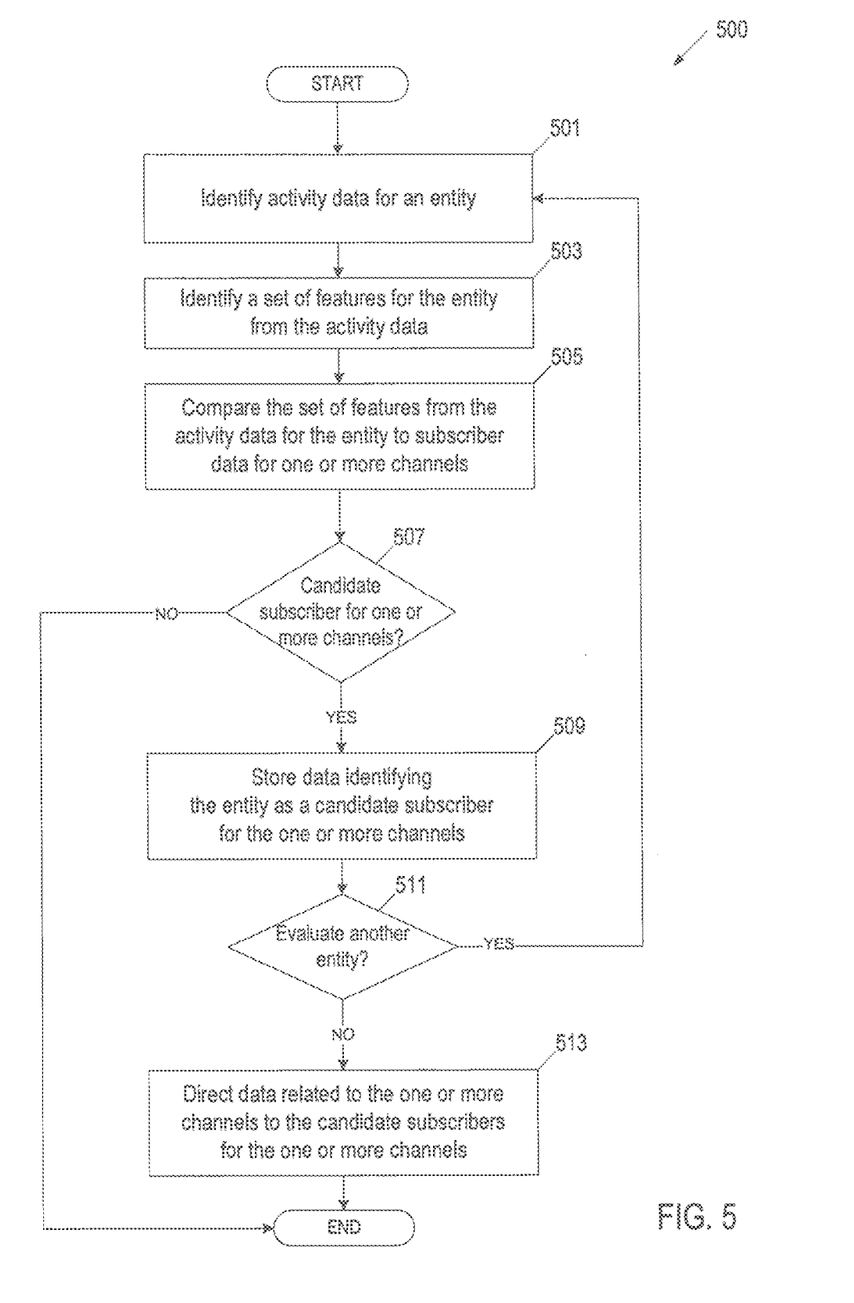
FIG. 5 is flow diagram of an implementation of a method for identifying candidate subscribers for the online media channels.

FIG. 5 is flow diagram of an implementation of a method 500 for identifying candidate subscribers for the online media channels. The method may be performed by processing logic that may comprise hardware (circuitry, dedicated logic, etc.), software (such as is run on a general purpose computer system or a dedicated machine), or a combination of both. In one implementation, the method 500 may be performed by the subscriber identifier module 169 hosted in a server 167 in a machine 160 of FIG. 1.

At block 501, the server identifies activity data for an entity. The activity data relates to one or more online media items. The server can receive events logs that store the activity data for the entity. The activity data can be for one or more sessions for the entity. An example session can be, and is not limited to, a period of one week. For example, the activity data can describe keyword searches for online media items for the entity for the past week, consumption of one or more videos by the entity during the last week, etc.

At block 503, the server extracts data items from the activity data and identifies a set of features (e.g., feature vector) for the entity from the extracted data items. For example, the server may create a feature vector for the entity using the extracted data items. The extracted data items can include, for example, and not limited to an identifier of the online media item, the type of event (e.g., search event, consumption event), the set of keywords for a search event, the set of results for a search event, consumption time, an indicator of whether an advertisement was skipped in relation to the event, a geographic identifier associated with the client device consuming an online media item, etc. In one implementation, the server creates a feature vector for searches performed by the entity and creates a separate feature vector for consumption of the online media items by the entity. For example, one feature vector can include the keywords used for a search and the results for the search, and another feature vector can include video identifiers, consumption time corresponding to the video identifiers, etc.

At block 505, the server compares the set of features (e.g., feature vector) from the activity data for the entity to subscriber data for one or more channels. The subscriber data includes sets of features (e.g., feature vectors) for the subscribers of the one or more channels. The sets of features for the subscribers of the channels can be in channel classifier models for the channels. In one implementation, there is one channel classifier model per channel. The server can input the set of feature (e.g., feature vector) for the entity into the classifier models for the one or more channels and can identify a set of features (e.g., feature vector) in one or more channel classifier models that is the closest match to the set of features (e.g., feature vector) for the entity. In one implementation, the server identifies a set of features (e.g., feature vector) in the one or more channel classifier models that matches the sets of features (e.g., feature vector) for a search event type and identifies another set of features (e.g., feature vector) in the one or more channel classifier models that matches the set of features (e.g., feature vector) for a consumption (e.g., video consumption) event type. The server can execute one or more of the channel classifier models using the feature vector for the entity as input, and the individual channel classifier models can locate the closest matching feature vector.

At block 507, the server determines whether the entity is a candidate subscriber for one or more of the channels. In one implementation, the server examines the label for the one or more matching feature vectors and compares the value of the label to criterion in the configuration data that corresponds to the label to determine whether the entity is a candidate subscriber for a particular channel. For example, the configuration data for the Car-Company Channel may specify that a label value of "1" indicates that the entity should be added to a list of candidate subscribers for the Car-Company Channel. In another example, the configuration data for the Satellite-Radio-Company Channel may specify that a label value of "1" indicates that the entity should be added to a list of candidate subscribers for the Satellite-Radio-Company Channel. In another example, the configuration data for the Jane Doe Channel for the musician Jane Doe may specify that a label value of "1" indicates that the entity should be added to a list of candidate subscribers for the Jane Doe Channel.

In another implementation, the server identifies multiple channels that have a co-visitation relationship and determines that when the entity is a candidate subscriber for one of the channels, then the entity is also a candidate subscriber for the other channels in the co-visitation relationship. For example, the server may determine that the Jane Doe Channel and the Funny Joe Channel have a co-visitation relationship based on the large number of entities watching content from the channels during the same week.

If the server determines that the entity is a candidate subscriber for one or more channels (block 507), the server can store data indicating that the entity is a candidate subscriber for the one or more channels at block 509. For example, the feature vector for the entity "User-289374983461" may have a closest matching feature vector in the classifier model for the Car-Company Channel that has a label of "1", may have a closest matching feature vector in the classifier model for the Satellite-Radio-Company Channel that has a label of "1", and may have a closest matching feature vector in the classifier model for the Jane Doe Channel that has a label of "0". The server can add "User-289374983461" to a list of candidate subscribers for the Car-Company Channel and to a list of candidate subscribers for the Satellite-Radio-Company Channel. The server can store the data in a data store that is coupled to the server.

In another example, the feature vector for the entity "User-289374983461" may have a closest matching feature vector in the classifier model for the Car-Company Channel that has a label of "0", may have a closest matching feature vector in the classifier model for the Satellite-Radio-Company Channel that has a label of "0", and may have a closest matching feature vector in the classifier model for the Jane Doe Channel that has a label of "1". The server can determine whether the Jane Doe Channel has any co-visitation relationships with other channels. For example, the server may determine that the Jane Doe Channel has a co-visitation relationship with the Funny Joe Channel. The server can add "User-289374983461" to a list of candidate subscribers for the Jane Doe Channel and to a list of candidate subscribers for the Funny Joe Channel.

At block 511, the server determines if there is data for another entity to evaluate. If there is data for another entity to evaluate, the server can return to block 501 to identify the activity data for the entity. If there is not data for another entity to evaluate (block 511), the server can direct data that is related to the channel to the candidate subscribers for the channel at block 513. For example, the server can allow advertisements for a channel to be directed to the candidate subscribers for the channel. For example, the server can direct an advertisement for Car-Company Channel to the entity "User-289374983461".

Figure 6:
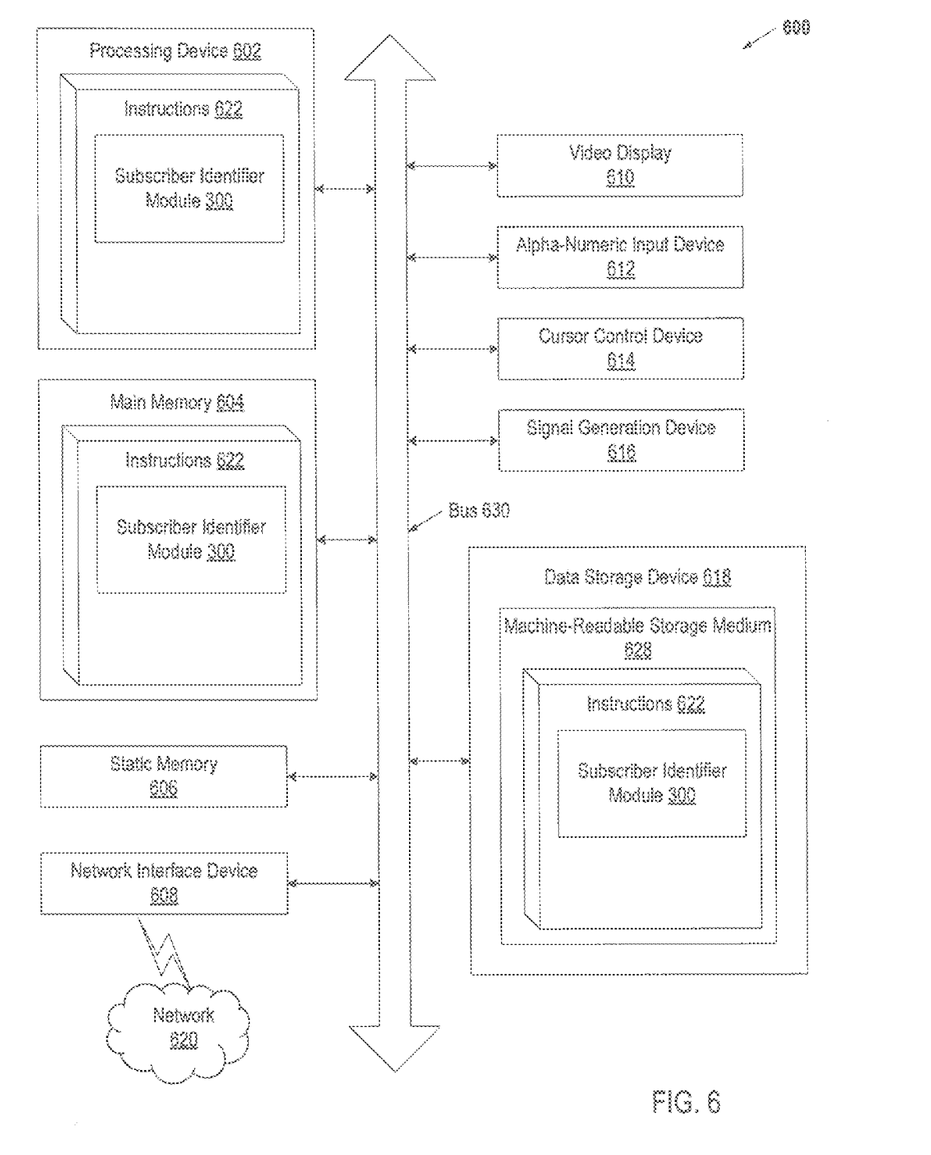
FIG. 6 is a block diagram of an example computer system that may perform one or more of the operations described herein, in accordance with various implementations.

FIG. 6 illustrates a diagram of a machine in an example form of a computer system 600 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processing device (processor) 602, a main memory 604 (e.g., read-only memory (ROM), flash memory, dynamic random access memory (DRAM) such as synchronous DRAM (SDRAM), double data rate (DDR SDRAM), or DRAM (RDRAM), etc.), a static memory 606 (e.g., flash memory, static random access memory (SRAM), etc.), and a data storage device 614, which communicate with each other via a bus 630.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 602 may also be one or more special-purpose processing devices such as an application specific integrated circuit (ASIC), a field programmable gate array (FPGA), a digital signal processor (DSP), network processor, or the like. The processor 602 is configured to execute instructions 622 for performing the operations and steps discussed herein.

The computer system 600 may further include a network interface device 604. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 614 may include a computer-readable storage medium 624 on which is stored one or more sets of instructions 622 (e.g., software) embodying any one or more of the methodologies or functions described herein. The instructions 622 may also reside, completely or at least partially, within the main memory 604 and/or within the processor 602 during execution thereof by the computer system 600, the main memory 604 and the processor 602 also constituting computer-readable storage media. The instructions 622 may further be transmitted or received over a network 620 via the network interface device 608.

In one implementation, the instructions 622 include instructions for a subscriber identifier module (e.g., subscriber identifier module 300 in FIG. 3) and/or a software library containing methods that call the subscriber identifier module. While the computer-readable storage medium 628 (machine-readable storage medium) is shown in an exemplary implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "extracting", "identifying", "determining", "directing", "inputting", "creating", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

For simplicity of explanation, the methods are depicted and described herein as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Certain implementations of the present disclosure also relate to an apparatus for performing the operations herein. This apparatus may be constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Reference throughout this specification to "one implementation" or "an implementation" means that a particular feature, structure, or characteristic described in connection with the implementation is included in at least one implementation. Thus, the appearances of the phrase "in one implementation" or "in an implementation" in various places throughout this specification are not necessarily all referring to the same implementation. In addition, the term "or" is intended to mean an inclusive "or" rather than an exclusive "or." Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
identifying activity data for a non-subscriber entity, the activity data relating to one or more online media items, the non-subscriber entity not being subscribed to a channel;
creating a set of features, from the activity data, representing interactions of the non-subscriber entity with the one or more online media items;
identifying a classifier model for the channel, the classifier model comprising a plurality of sets of features for a plurality of subscribers of the channel;
determining, based on the classifier model, whether the set of features from the activity data of the non-subscriber entity corresponds to at least one set of features in the plurality of sets of features that are based on subscriber data for the plurality of subscribers of the channel, wherein the determining comprises identifying at least one of the plurality of sets of features from the classifier model that correspond to the set of features representing interactions of the non-subscriber entity based on the set of features, representing interactions of the non-subscriber entity, as input to the classifier model;
determining, by a server computer system, that the non-subscriber entity is a candidate subscriber for the channel when the set of features from the activity data of the non-subscriber entity corresponds to at least one set of features of the plurality of sets of features from the subscriber data for the plurality of subscribers of the channel; and
serving content related to the channel for presentation to the non-subscriber entity that is a candidate subscriber.

2. The method of claim 1, wherein the content related to the channel is an advertisement for the channel.

3. The method of claim 1, further comprising:
identifying a relationship between the channel and another channel; and
determining that the non-subscriber entity is a candidate subscriber for the other channel based on the relationship between the channel and the other channel.

4. The method of claim 1, further comprising:
extracting the plurality of sets of features from activity data for the plurality of subscribers that subscribe to the channel, the plurality of sets of features for the subscribers representing interactions of the subscribers with one or more online media items; and
creating the classifier model using the plurality of sets of features for the subscribers.

5. The method of claim 1, wherein the activity data comprises at least one of data relating to one or more searches for one or more online media items or consumption of one or more online media items.

6. The method of claim 1, wherein the set of features representing interactions of the non-subscriber entity comprises at least one of an identifier of an online media item, an event type, a set of keywords for a search, a set of search results, consumption time, or a geographic identifier.

7. A system comprising:
a memory; and
a processing device coupled with the memory to:
identify activity data for a non-subscriber entity, the activity data relating to one or more online media items, the non-subscriber entity not being subscribed to a channel;
create a set of features, from the activity data, representing interactions of the non-subscriber entity with the one or more online media items;
identify a classifier model for the channel, the classifier model comprising a plurality of sets of features for a plurality of subscribers of the channel;
determine, based on the classifier model, whether the set of features from the activity data of the non-subscriber entity corresponds to at least one set of features in the plurality of sets of features that are based on subscriber data for the plurality of subscribers of the channel, wherein to determine comprises identifying at least one of the plurality of sets of features from the classifier model that correspond to the set of features representing interactions of the non-subscriber entity based on the set of features, representing interactions of the non-subscriber entity, as input to the classifier model;
determine that the non-subscriber entity is a candidate subscriber for the channel when the set of features from the activity data of the non-subscriber entity corresponds to at least one set of features of the plurality of sets of features from the subscriber data for the plurality of subscribers of the channel; and
serve content related to the channel for presentation to the non-subscriber entity that is a candidate subscriber.

8. The system of claim 7, wherein the content being related to the channel is an advertisement for the channel.

9. The system of claim 7, wherein the processing device is further to:
identify a relationship between the channel and another channel; and
determine that the non-subscriber entity is a candidate subscriber for the other channel based on the relationship between the channel and the other channel.

10. The system of claim 7, wherein the processing device is further to:
extract the plurality of sets of features from activity data for the plurality of subscribers that subscribe to the channel, the plurality of sets of features for the subscribers representing interactions of the subscribers with one or more online media items; and
create the classifier model using the plurality of sets of features for the subscribers.

11. The system of claim 7, wherein the set of features representing interactions of the non-subscriber entity comprises at least one of an identifier of an online media item, an event type, a set of keywords for a search, a set of search results, consumption time, or a geographic identifier.

12. A non-transitory computer readable storage medium encoding instructions thereon that, in response to execution by a processing device, cause the processing device to perform operations comprising:
identifying activity data for a non-subscriber entity, the activity data relating to one or more online media items, the non-subscriber entity not being subscribed to a channel;

creating a set of features, from the activity data, representing interactions of the non-subscriber entity with the one or more online media items;

identifying a classifier model for the channel, the classifier model comprising a plurality of sets of features for a plurality of subscribers of the channel;

determining, based on the classifier model, whether the set of features from the activity data of the non-subscriber entity corresponds to at least one set of features in the plurality of sets of features that are based on subscriber data for the plurality of subscribers of the channel, wherein the determining comprises identifying at least one of the plurality of sets of features from the classifier model that correspond to the set of features representing interactions of the non-subscriber entity based on the set of features, representing interactions of the non-subscriber entity, as input to the classifier model;

determining, by the processing device, that the non-subscriber entity is a candidate subscriber for the channel when the set of features from the activity data of the non-subscriber entity corresponds to at least one set of features of the plurality of sets of features from the subscriber data for the plurality of subscribers of the channel; and serving content related to the channel for presentation to the non-subscriber entity that is a candidate subscriber.

13. The non-transitory computer readable storage medium of claim 12, wherein the content related to the channel is an advertisement for the channel.

14. The non-transitory computer readable storage medium of claim 12, wherein the operations further comprise:

identifying a relationship between the channel and another channel; and determining that the non-subscriber entity is a candidate subscriber for the other channel based on the relationship between the channel and the other channel.

15. The non-transitory computer readable storage medium of claim 12, the operations further comprising:

extracting the plurality of sets of features from activity data for the plurality of subscribers that subscribe to the channel, the plurality of sets of features for the subscribers representing interactions of the subscribers with one or more online media items; and creating the classifier model using the plurality of sets of features for the subscribers.

16. The non-transitory computer readable storage medium of claim 12, wherein the activity data comprises at least one of data relating to one or more searches for one or more online media items or consumption of one or more online media items.

17. The non-transitory computer readable storage medium of claim 12, wherein the set of features representing interactions of the non-subscriber entity comprises at least one of an identifier of an online media item, an event type, a set of keywords for a search, a set of search results, consumption time, or a geographic identifier.

* * * * *